United States Patent

[11] 3,568,742

| [72] | Inventors | Edward V. Frankenberg;<br>Norman N. Griffith, Jacksonville, Fla. |
|---|---|---|
| [21] | Appl. No. | 866,950 |
| [22] | Filed | Oct. 16, 1969<br>Division of Ser. No. 727,853, May 9, 1968. |
| [45] | Patented | Mar. 9, 1971 |
| [73] | Assignee | Fleco Corporation<br>Jacksonville, Fla. |

[54] TREE SHEARING DEVICE WITH ANVIL
2 Claims, 7 Drawing Figs.

[52] U.S. Cl................................................... 144/34,
83/607, 83/658, 144/3
[51] Int. Cl................................................... A01g 23/02
[50] Field of Search........................................ 144/2 (21),
3 (4), 34, 34 (1—5), 309 (34); 83/607, 608, 609,
658, 700

[56] References Cited
UNITED STATES PATENTS

| 214,533 | 4/1879 | Straffin.......................... | 83/658 |
| 2,845,101 | 7/1958 | Hoadley........................ | 144/34 |
| 3,059,677 | 10/1962 | Busch et al................. | 144/309 |

Primary Examiner—Gerald A. Dost
Attorneys—George H. Baldwin and Arthur G. Yeager ABSTRACT: An improved tree shear device having a cutting blade pivotally mounted on a frame and powered by a cylinder and piston against an anvil which is removably attached to the frame so that the anvil can be properly shimmed to meet the cutting edge of the blade upon initial installation and after sharpening of the cutting edge.

PATENTED MAR 9 1971 3,568,742
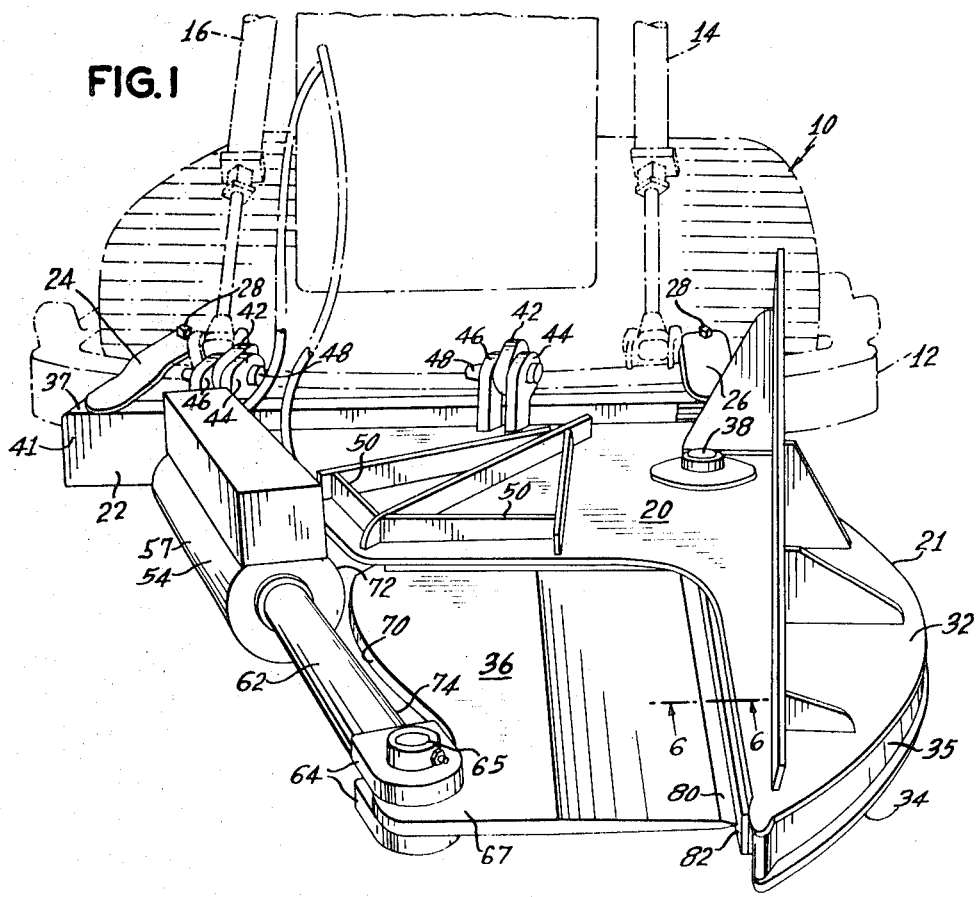
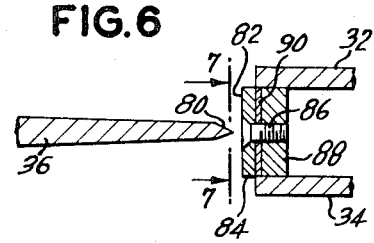
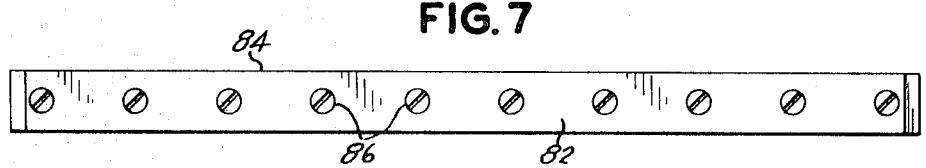
INVENTORS
Edward V. Frankenberg
Norman N. Griffith
BY
George H. Baldwin
ATTORNEY

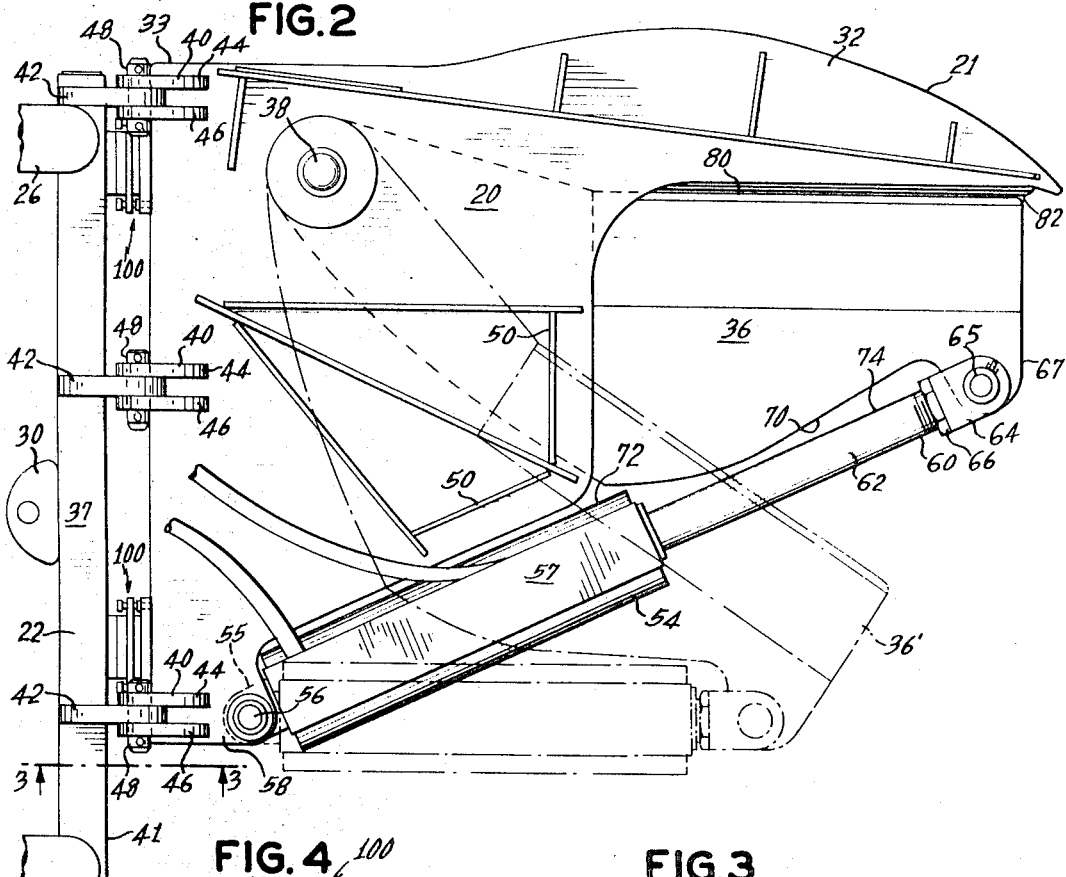
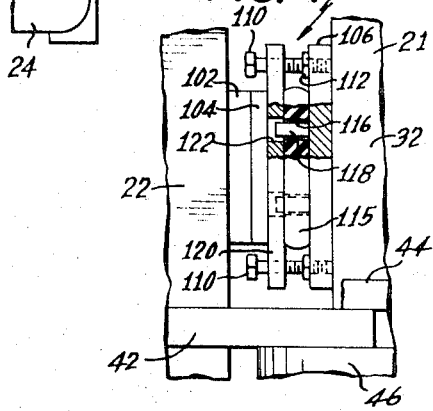
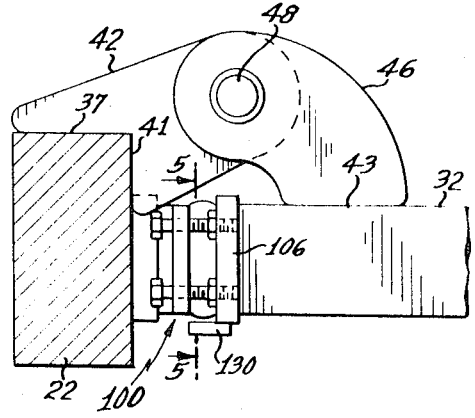
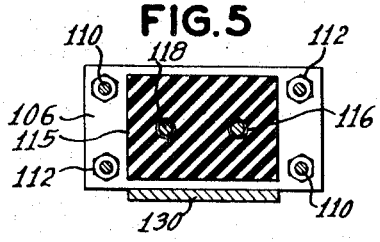
INVENTORS
Edward V. Frankenberg
Norman N. Griffith
BY George H. Baldwin
ATTORNEY 3,568,742

TREE SHEARING DEVICE WITH ANVIL

CROSS-REFERENCE TO RELATED APPLICATION

This application is a division of application Ser. No. 727,853, filed May 9, 1968, entitled Tree Shear Assembly.

BACKGROUND OF THE INVENTION

1. Field of the Invention

This invention relates to a tree shear device with anvil and more particularly to a device for attachment to a tractor for severing and felling trees and the like.

2. Description of the Prior Art

There have been many tree felling devices available on the market and many such devices were patented. Among the various prior art patents relating to tree shear devices are the following: U.S. Pat. Nos. 2,214,334; 2,565,252; 2,612,194; 2,876,816; 3,196,911; 3,270,787 and 3,327,745. In U.S. Pat. No. 3,327,745, the blade, while being pivotally attached to the frame, does not meet an anvil or the like which results in a clean cut through the tree being felled. While anvils have been shown in tree severing equipment (for example U.S. Pat. Nos. 2,612,194 and 2,876,816), the blade is slidingly powered toward the anvil and the hydraulic cylinders may be adjusted to limit or extend the blade travel so that the cutting edge meets the anvil. In pivotally arranged cutting blades of the prior art, either no anvil has been employed or cutting blades would be replaced rather than resharpened. The problems of the prior art have now been substantially alleviated in accord with this invention by the pivotal mounting of the blade with a removable and shimmable anvil, as described hereinafter.

SUMMARY

The tree shearing device in accord with this invention includes a shear head having a cutting blade pivotally attached to a frame with the cutting edge adapted to meet an anvil. An elongated upright anvil is releasably connected to the frame of the shear head and shim means are removably placed therebetween to close any gap between the anvil and the cutting edge of the blade initially and during wear and resharpening of the cutting edge of the blade.

A general object of this invention is to provide an improved tree shear device with anvil.

A particular object is the provision of an improved anvil for a pivotally mounted shear blade of a shear head which is adjustably supported thereon for closing the gap between the sharpened cutting edge and anvil permitting uniform sharpening of the blade due to wear, chipping or the like.

Other object of this invention include providing a tree shear device with anvil and durable in construction, economically manufactured and maintained and easily operable by the driver of the tractor.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a front perspective view of the tree shear device with anvil in accord with the invention mounted on the front end of a tractor, the tractor being shown by broken lines;

FIG. 2 is a plan view of the tree shear device with anvil, the open blade position being shown by broken lines;

FIG. 3 is an enlarged cross-sectional view taken along lines 3–3 of FIG. 2;

FIG. 4 is an enlarged plan view of a portion of the assembly of FIG. 2 with parts broken away for clarity;

FIG. 5 is a cross-sectional view taken along lines 5–5 of FIG. 3;

FIG. 6 is an enlarged cross-sectional view of the blade and anvil taken along line 6–6 of FIG. 1; and FIG. 7 is an elevational view of the anvil taken along line 7–7 of FIG. 6.

DESCRIPTION OF THE PREFERRED EMBODIMENT

Referring now to the drawings and particularly FIG. 1, the conventional tractor is designated by broken lines 10 which includes a framing member in the form of a standard C-frame 12 raisable and lowerable by a pair of oppositely disposed hydraulic cylinder assemblies 14 and 16 connected to and positioned on respective opposite sides of the tractor 10 in a manner well known in the art.

The shear assembly 20, in accord with the invention, includes an elongated beam or member 22 extending generally forwardly of and along tractor 10, and member 22 is connected to C-frame 12 by two rearwardly extending pairs of arms, including arms 24 and 26, welded to member 22, which extend above and below frame 12 with bolt connections 28 securing rearward arm ends of respective pairs of arms together. A pair of spaced ears, including ear 30, are welded to and extend rearwardly of member 22 for releasable connection to a portion (not shown) of C-frame 12 generally medially thereof, ear 30 only being shown in FIG. 2.

A pair of generally parallel and spaced plates 32 and 34 with blade 36 positioned therebetween, are disposed forwardly of member 22. Plates 32 and 34 are maintained in proper spaced position by a plurality of spacers, including spacer 35, welded therebetween. A pivotal connection 38 mounts blade 36 between plates 32 and 34 for restricted pivotal motion between its fully closed position and its fully open position 36'. Pivotal connections 40 are spaced along member 22 and connect member 22 with the rearward end portion 33 of the upper plate 32. Each connection 40 includes an upwardly extending ear 42 welded to the upper horizontal surface means 37 and upright surface means 41 of member 22 and a pair of upwardly extending and spaced ears 44 and 46 welded to the upper surface means 43 of plate 32 with a pin means 48 connecting adjacent upper ends of ears 42, 44 and 46.

The blade 36 rides between plates 32 and 34 on suitable bearing members (not shown) disposed generally along and beneath plate reinforcing members 50, such bearing members being disposed on the inward surfaces of plates 32 and 34 and generally oppositely facing each other. Power means in the form of a hydraulic cylinder and piston 54 at its rearward end 55 is positioned between a portion 58 of each of plates 32 and 34 and a vertical pivot pin 56 connects end 55 thereto. As seen in FIG. 2, pin 56 is disposed generally opposite to the pivotal connection 38 of blade 36 and permits cylinder 57 to pivot about pin 56 as cylinder 57 moves blade 36 between its open and closed positions. The forward end 60 of piston rod 62 is internally threaded and an externally threaded portion (not shown) of clevis 64 is connected therewithin, a lock nut 66 being provided about the clevis externally threaded portion to partially adjust and releasably fix the limit of the blade travel with respect to the anvil 82. The clevis 64 is connected by a vertical pivot pin 65 to the forward portion 67 of blade 36.

The blade 36 in accord with this invention is preferably designed to have a rear edge portion, that edge portion 70 generally opposite to cutting edge 80 and exposed from between plates 32 and 34, so that during the blade travel, from the fully open broken line position 36' in FIG. 2 to its fully closed full line position shown in FIGS. 1 and 2, the rear edge portion 70 will barely be out of contact with the inwardly disposed edge 72 of cylinder 57 and/or edge 74 of piston rod 62. The spacing between the rod edge 74 and cylinder edge 72 and the blade rear edge 70 is minimized throughout the movement of the blade 36 so that limbs and/or brush or the like of limited size only can work into or fall into spacing. Any large limbs or brush are inhibited from entry into such spacing thereby affording protection to the cylinder 54 and rod 62 and minimizing damage thereto otherwise resulting when larger limbs or the like are caught in such spacing. In other words, if the spacing were not minimized, large limbs could become lodged in such spacing, and when cylinder 54 was activated, rod 62 may be bent or broken and/or other damage could be caused to the cylinder 54 or other components. Also, such large limbs would probably prevent the full travel of the blade cutting edge 80 from cutting through the tree trunk disposed between cutting edge 80 and anvil 82.

The anvil 82 in accord with another aspect of the invention comprises an elongated bar 84 removably connected by spaced fasteners in the form of screws 86 to an upright frame member 88 welded to and between plates 32 and 34. A shim 90 is located between bar 84 and member 88 which may be removed and replaced by a thicker and/or wedged shaped shim when the blade edge 80 is sharpened after wear thereof. Also, the entire blade edge 80 need not require sharpening thus permitting partial shims to be placed between bar 84 and member 88 to compensate for the sharpening of only a portion of the blade edge 80. In this connection, the blade edge 80 will be normally sharpened along a generally straight line so that after proper shimming of the anvil bar 84, the bar 84 will meet the sharpened edge 80 of the blade 36. Preferably, the blade is sharpened uniformly requiring a uniform thicker shim to close the gap between blade edge 80 and anvil 82. The adjustable clevis 64 and rod 62 also may be used to partially close the gap between blade 36 and the anvil 82 after sharpening of the blade, but the adjustment in this manner may require more of the blade to be ground adjacent the heel of the anvil, thus requiring a greater degree of skill and care in sharpening the blade.

According to the invention yieldable stop means 100 are provided between framing member 22 and the ends of plates 32 and 34 beneath the horizontal pivotal axis for the shear head 21 of assembly 20, such axis being provided by aligned pin means 48 in each pivotal connection 40 whereby shear head 21 may be lifted from its generally horizontal, tree cutting, operative position shown in FIGS. 1 and 2 to a generally vertical, traveling, and inoperative position (not shown). The shear head 21 may be raised and lowered by a common cable and winch normally provided on the tractor 10.

The shear head assembly, as shown in the drawings, is either in cutting position on a downward slope or out of contact with the ground. When in use the shear head 21 may assume a tree cutting position which is horizontal with the tractor similarly being horizontal, or which is inclined upwardly or downwardly with respect to the horizontal. In other words, the tree shear assembly can be used for cutting trees on flat land, rolling terrain and on the slopes of hills over which a tractor can be adequately maneuvered. In the normal tree cutting positions the stop means are not in operative contact unless the shear head is out of engagement with the ground or the shear head is positioned on a downward slope with respect to the tractor.

The components of the yieldable stop means 100 may best be understood by reference to FIGS. 3, 4 and 5 in which a pair of generally rectangular plates 102 and 104 are suitably welded together and to the upright surface means 41 of member 22. Oppositely facing plates 102 and 104 is a generally rectangular plate 106 welded to each of the end edges of parallel plates 32 and 34, such end edges forming an upright surface means opposite to and generally parallel with the upright surface means 41 of member 22. A plurality of threaded bolts 110 and adjustably connected to plate 106 and extend rearwardly toward tractor 10 and plates 102 and 104. A lock nut 112 is threaded onto each bolt 110 for adjustably affixing the rearward extend of bolt 110. Juxtaposed with respect to plate 106, opposite to its connection with the ends of parallel plates 32 and 34, is a yieldable and resilient rectangular member 115 make of rubber or the like, member 115 being maintained in juxtaposition by rearwardly extending lugs 118 attached to plate 106 and passing through a pair of spaced openings 116 to member 115. A plate 120 is slidingly disposed on bolts 110 and is juxtaposed with respect to member 115 opposite to plate 106. Plate 120 includes a pair of openings 122 therethrough aligned with lugs 118, so that when member 115 is substantially compressed between plates 106 and 120, the lugs 118 may move into openings 122 as shown in FIG. 4. Lugs 118 function to retain member 115 properly disposed between plates 106 and 120 when there is a lack of any compressive force, as when the shear head 21 is in its upstanding traveling position. Affixing member 115 to plate 106 by gluing or the like is undesirable since the forces imposed on member 115 would have a tendency to tear and/or otherwise become damaged and would not be readily replaceable. A flat bar 130 is welded to plate 106 and extends rearwardly beneath rubber member 115 to protect same from brush or other obstructions which may damage same during use of the tree shear or during travel of the shear head in an upstanding manner.

While only a certain preferred embodiment of this invention has been shown and described by way of illustration, many modifications will occur to those skilled in the art and it is intended that all such modifications be included within the true spirit and scope of this invention.

We claim:

1. In a tree shear for attachment to a tractor comprising a shear head having an operative tree cutting position generally closely adjacent to and parallel to the ground, said shear head including a generally horizontal cutting blade having an elongated cutting edge, a frame, means for connecting said blade to said frame, an elongated generally upright anvil extending horizontally and parallel to said cutting edge and being generally coextensive with said cutting edge, a plurality of fasteners spaced along said anvil for adjustably securing said anvil to said frame, shim means between said anvil and said frame, said fasteners extending through said anvil and into said frame to firmly attach said anvil thereto with said shim means therebetween, said shim means being adapted for replacement by thicker or thinner or partial shim means whereby the spacing between said cutting edge and anvil is readily adjustable either uniformly along said anvil or the angle between said anvil and cutting edge is readily adjustable particularly after periodic sharpening of said cutting edge, power means for moving said blade from its open position providing an open tree-receiving space between said cutting edge and said anvil to a closed position with said cutting edge closely adjacent to and extending along said anvil, said blade and anvil being adapted to cleanly cut through the trunk of the tree closely adjacent to the ground.

2. In the tree shear as defined in claim 1, wherein at least some of said plurality of fasteners extend through said shim means for firmly attaching said shim means and anvil to said frame.